United States Patent [19]

Hawkins

[11] 4,278,833
[45] Jul. 14, 1981

[54] DAMPING SPACER WITH HUB INTERLOCK

[75] Inventor: Ronald G. Hawkins, Massena, N.Y.

[73] Assignee: Aluminum Company of America, Pittsburgh, Pa.

[21] Appl. No.: 176,084

[22] Filed: Aug. 7, 1980

Related U.S. Application Data

[63] Continuation-in-part of Ser. No. 39,879, May 17, 1979, Pat. No. 4,223,176.

[51] Int. Cl.³ .................. H02G 7/14; H02G 7/12
[52] U.S. Cl. .................................. 174/42; 174/146
[58] Field of Search ........................... 174/42, 146

[56] References Cited

U.S. PATENT DOCUMENTS 4,223,176  9/1980  Hawkins ................. 174/42

*Primary Examiner*—Laramie E. Askin
*Attorney, Agent, or Firm*—Elroy Strickland

[57] ABSTRACT

A damping spacer for two parallel overhead conductors in which two rigid spacing members are provided with integral hub structures disposed on opposed sides of a disc-like inertial weight structure. The structures have circular, integral raised wall portions and recesses. The thickness of the wall portions is less than the width of the recesses, and the wall portions are opposed and radially offset, such than when the recesses and raised wall portions of the hub and disc structures are placed together in mating relationship, and with the arms of the hub structures located in a position to be clamped to two overhead conductors, the recesses in the hub and disc structures permit the wall portions of the structures to move in the recesses, the wall portions of the respective structures serving to limit relative movement of the spacing members. The weight or mass of the disc structure is off-centered in the direction of one of the overhead conductors. Elastomer bushings are located between the disc and hub structures.

1 Claim, 12 Drawing Figures

DAMPING SPACER WITH HUB INTERLOCK

CROSS REFERENCE TO RELATED APPLICATION

This is a continuation-in-part application of application Ser. No. 39,879, filed May 17, 1979, now U.S. Pat. No. 4,223,176.

BACKGROUND OF THE INVENTION

The present invention relates generally to damping spacers for overhead conductor bundles, and particularly to an inertial weight means that is effective to dampen the vibration of two conductor bundles that tend to vibrate in phase.

In U.S. Pat. No. 3,940,553, issued in the name of the present inventor, Ronald G. Hawkins, the arms of a frameless damping spacer have hub structures that contain two elastomer damping elements. With relative rotational motion of the arms about the axis of a central pin securing the arms and damping elements together, the damping elements are effective to dampen the energy of the motion. However, relative vertical motion of the arms of the spacer, with a vertical arm connected to a lowermost conductor of a three-conductor bundle, is limited by the pin, the pin directly engaging the hub structure of each arm. Similarly, for the same reason, relative elliptical motion of the arms about the axis of the pin is not permitted.

However, as discussed in the text of the Hawkins patent, the structure disclosed therein has a number of significant advantages over damping spacers previous to the patent.

In U.S. Pat. No. 3,613,104 to Bradshaw, a frame-type damping spacer is shown in which the arm of a conductor clamp is provided with an opening 42 that accommodates a rubber sleeve 44. The arm and sleeve are then located and secured between two torsion discs located in hub portions of a frame member. The arm and frame members are provided with stop means 50, 51 and 52 to protect the sleeve and discs from excessive conductor motion. It will be noted that damping is again effected by rotational or torsional stresses imposed on the discs; other motions are limited by the direct mechanical connection of the frame and securing pin (FIG. 5) and by the sleeve between the clamp arm and pin; no travel space is provided between the arm and frame except that afforded by the discs and sleeve.

BRIEF SUMMARY OF THE INVENTION

The present invention applies the advantages of the structure of the above Hawkins patent to two-conductor bundle arrangements that are particularly difficult to dampen. More particularly, the present invention is directed to a damping spacer having two spacing arms provided with integral hub structures that permit vertical and rotational compliance of an inertial disc-like structure located between the hub structures, as well as elliptical and rotational compliance of the spacing arms about the axis of a central pin, while simultaneously providing positive stop means for all such movements. In this manner, the elements that effect damping, which are contained between the inertial disc and hub structures, are not damaged by excessive conductor movement. This is accomplished by providing the disc and hub structures with mating circular groove and tongue portions, with the width of the tongues being appropriately smaller than the width of the associated grooves such that a clearance is provided between them that permits the relative movement of the spacer structures. With excessive conductor motion, the respective tongues abut against each other to provide the above positive stop means. The mass of the inertial weight is off-centered in the direction of one conductor such that its tendency to rotate about its axis is greatly enhanced (actually doubled over a symmetrical weight in tests conducted with the respective weights). In-phase vibration of the conductors caused working of the damping elements to dampen such vibration.

THE DRAWINGS

The invention, along with its objectives and advantages, will be best understood from the following detailed description and the accompanying drawings in which.

PREFERRED EMBODIMENTS OF THE INVENTION

Figures 1, 2:
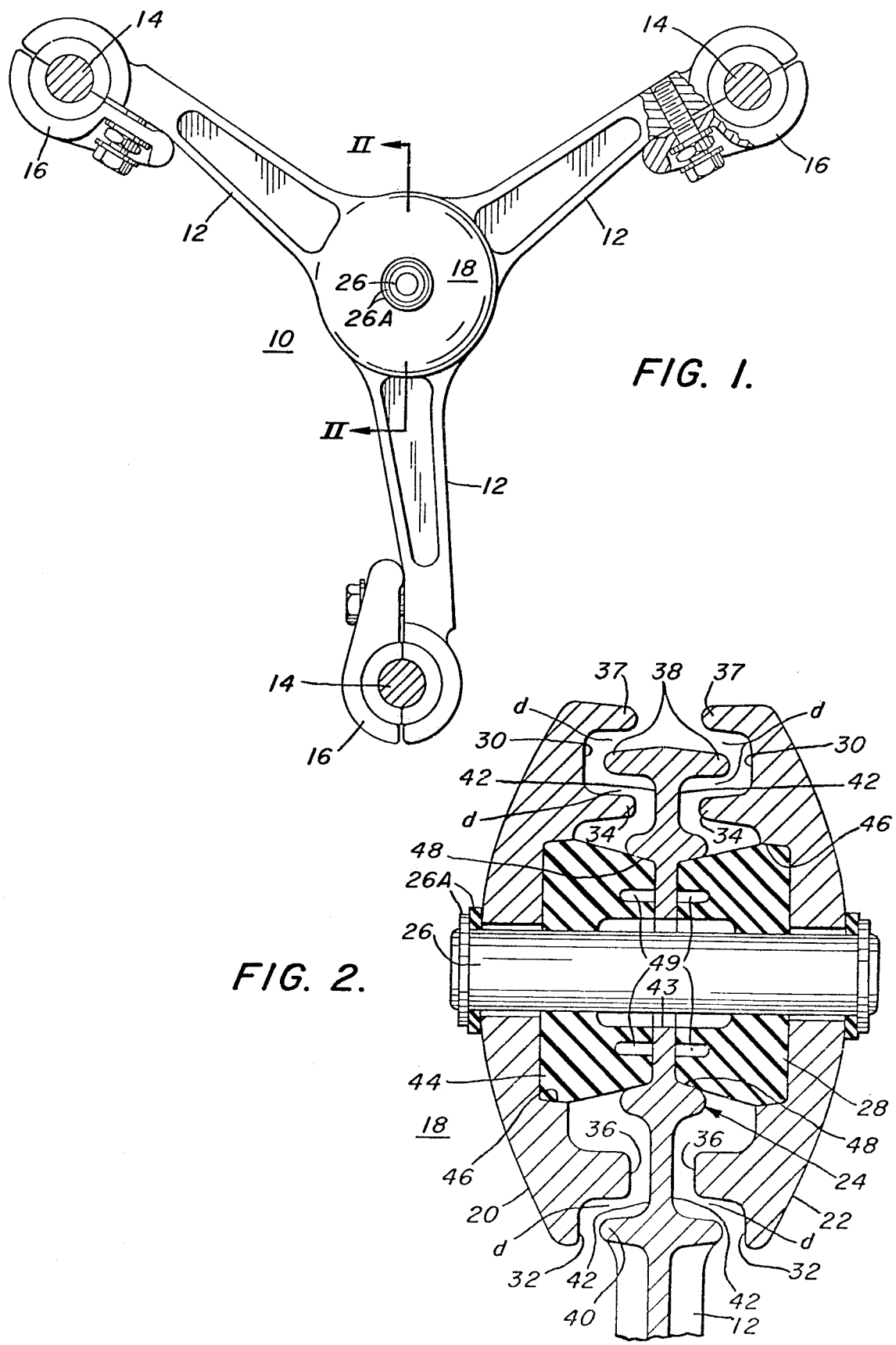
FIG. 1 is a side elevation view of a three-conductor, frameless damping spacer of the invention.
FIG. 2 is a vertical section of the spacer of FIG. 1 taken along lines II—II in FIG. 1.

Referring now to the drawings, and particularly to FIG. 1 thereof, a frameless damping spacer 10 is shown in side elevation, the spacer having three arms 12 for spacing respectively three overhead conductors 14. The arms have conductor clamps 16, at one end thereof, shown clamped on conductors 14 in FIG. 1, and integral hub portions 18, at the end thereof, the hub portions and assembly thereof being best seen in cross section in FIG. 2. Two, disassembled hubs are also shown in plan view in FIGS. 7 and 8 of the drawings.

More particularly, hub assembly 18, as shown in section in FIG. 2, comprises two, outside hub structures 20 and 22, and a third, inside hub structure 24, associated with a vertical, downwardly extending arm 12, which is fully depicted in FIG. 1. The three hub structures (and associated arms 12) are secured together to form spacer 10 by a rigid pin means 26 extending perpendicularly through the hub structures, as shown in FIG. 2. Pin means 26, in addition, secures two elastomer damping elements or bushings 28 respectively between the three hub structures.

Figure 7:
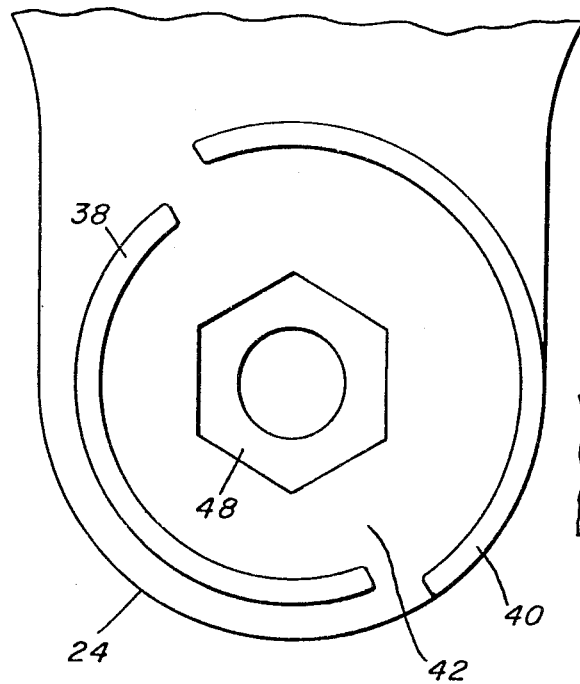
FIG. 7 is a plan view of one hub structure of the invention.
Figure 8:
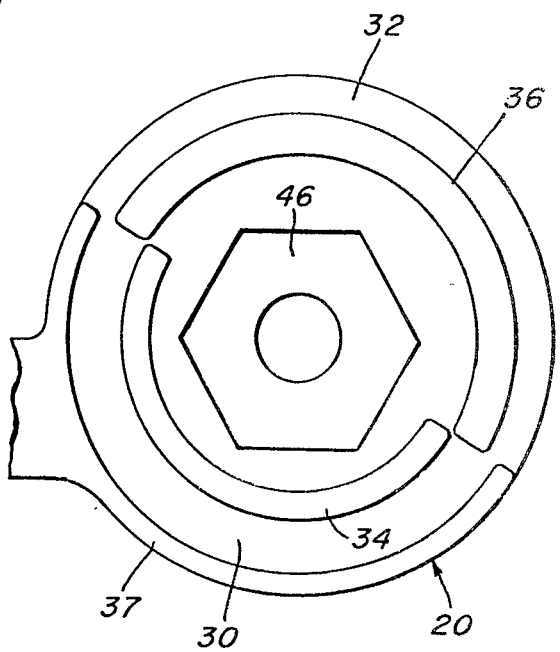
FIG. 8 is a plan view of another hub structure of the invention, the hub structures of FIGS. 7 and 8 being adapted to mate together, as shown in FIG. 9.

Continuing with the view in FIG. 2, with reference also to the plan views of the two hub structures in FIG. 7 and 8, the inward faces of the two outside hub structures (20 and 22) of the invention are each provided with two, opposed semi-circular grooves or recesses 30 and 32, and two, opposed, semi-circular tongues or wall portions 34 and 36. In addition, a third, peripheral semi-circular wall portion 37 is located radially outside of and spaced from wall portion 34, such that recess 30 is defined by 34 and 37. Hence, in viewing the outside hub shown in FIG. 8, circular recess 30 is terminated by tongue 36, and vice versa, while tongue 34 terminates adjacent the ends of 36. Further, in reference to FIG. 8, opposed tongues 34 and 36 are radially offset from each other. When the outside hubs 20 and 22 are placed together with inside hub 24 in the manner of FIGS. 1 and 2, and when the arms 12 are angled in the manner of FIG. 1, to be attached to the two upper conductors 14 of a three-conductor bundle, the recesses and tongues of 20 and 22 face each other in the same plane.

In a manner similar to the above outside hubs 20 and 22, and as seen in viewing FIGS. 2 and 7, both faces of the inside hub 24 of the invention are provided with two, opposed, semi-circular tongues or wall portions 38 and 40, and a circular recess 42 located inwardly of the wall portions. Again, as best seen in the plan view of FIG. 7, the opposed wall portions 38 and 40 are radially offset.

Figure 9:
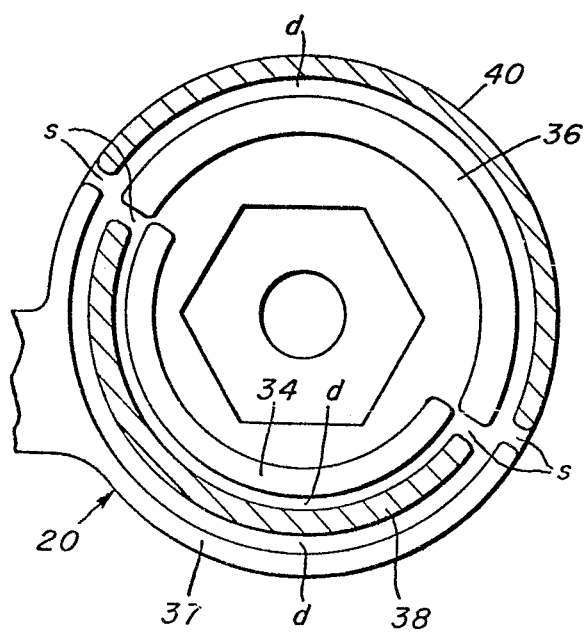
FIG. 9 shows in plan and partial section the hub structures of FIGS. 7 and 8, disposed in mating relationship.

Referring again to FIG. 2, the three-conductor spacer of the invention is assembled in the manner that locates the semi-circular tongues 34 and 36 of outside hubs 20 and 22 in the circular groove 42 of the inside hub 24, and the tongues 38 and 40 of the inside hub 24 in recesses 30 and 32 in the outside hubs. In plan view, this is seen in FIG. 9, with tongues 38 and 40 being shown in section, while tongues 34, 36 and 37 are shown in elevation. The relative width of the tongues and of the recesses is such that travel distance d is provided between 36 and 40, between 34 and 38, and between 37 and 38, i.e. the width of the tongues is substantially smaller than the width of the recesses.

Similarly, the inside hub and arm are provided with an opening 43 that accommodates pin 26, the diameter of the opening between being larger than the diameter of the pin. Together, the size of opening 43 and space d provided between the tongues of the hubs, provide a travel distance that is particularly suitable for damping aeolian vibration, which is vertical and of small amplitude.

Continuing with the view in FIG. 9, the ends of the tongues of the outside hubs and of the inside hubs are disposed in curved alignment such that with relative rotation of arms 12 about pin 26 of a magnitude sufficient to overcome a predetermined travel distance or space s between the ends, the ends engage or abut each other to limit relative rotational movement. Travel spaces d and s are thus chosen to provide a predetermined amount of relative movement of the spacer arms, upon the occurrence of motion or vibration of conductors 14, to effect damping of such motion via the working of elastomer elements 28. Any movement in excess of d and/or s is stopped by the engagement of the tongues, along either the side surfaces or ends thereof, depending upon the type of motion involved, such that the damping elements are protected from excessive conductor motion.

Figure 10:
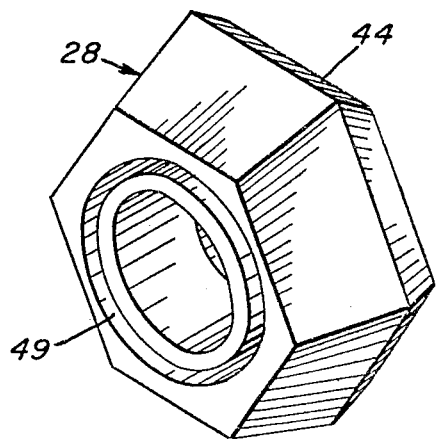
FIG. 10 is a perspective view of a damping element employed in the structures of FIGS. 1 through 9.

Damping elements 28 are provided with a hexagonal or other suitable external configuration, such that when the elements are properly located in respective recesses provided in the hub structures and having the same configuration as elements 28, the damping elements will be secured between the hubs to properly perform their damping function. More particularly, as seen in FIGS. 2 and 10, elements 28 have a base portion 44 that seats in a recess 46 (FIGS. 2 and 8) provided in the inside face of each hub 20 and 22, recess 46 being in the center of hubs 20 and 22, as shown in plan view in FIG. 8 of the drawings. From the base portion 44, the elements or bushings preferably taper inwardly, as shown in FIGS. 2 and 10, so that the end of each bushing that is opposite base end 44 is something less in breadth than end 44. This smaller end (and face) of each bushing is also shaped to seat in a correspondingly shaped recess 48 provided in the faces of inside hub 24 and located within the circular recess 42 existing in the faces of inside hub 24, one such recess 48 being depicted in plan view in FIG. 7 of the drawings.

In addition, each bushing 28 may be provided with a recess or slot 49 extending inwardly from its smaller face, and partway into the body of the bushing toward the other face of the bushing, as indicated in FIGS. 2 and 10. Slot 49 is preferably a continuous, circular recess, as shown in the perspective view of FIG. 10. Such a slot and the dimension of the smaller end of each bushing, as depicted, allow ease of compliance of inside spacer arm 12 when a lower, vertical conductor, such as shown in FIG. 1, undergoes vibration.

Figure 4:
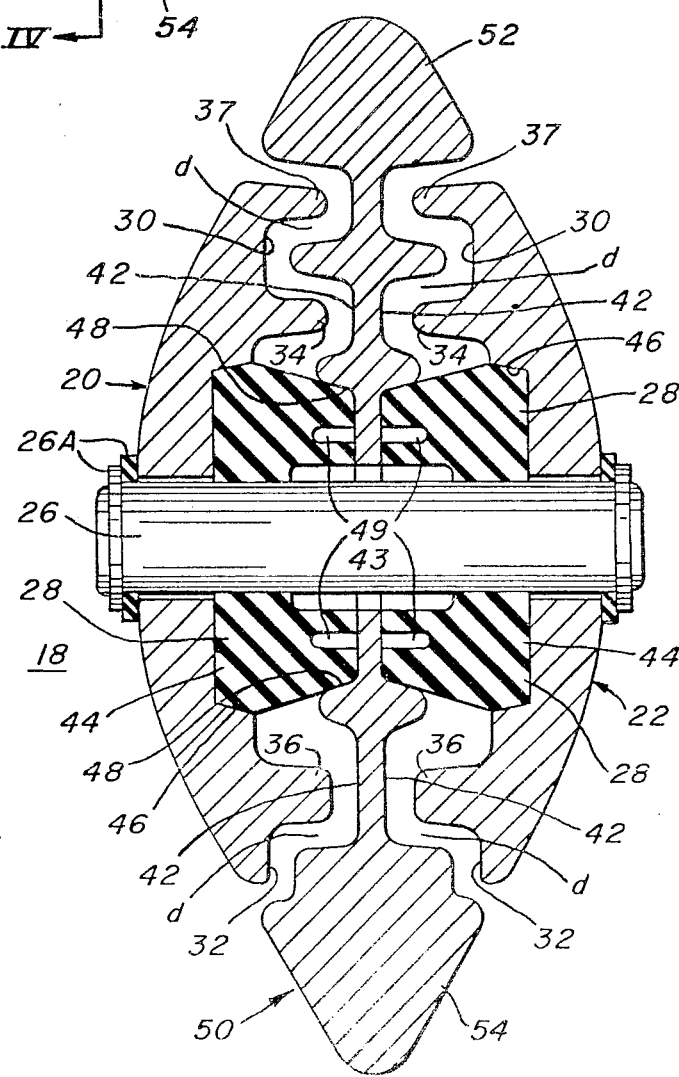
FIG. 4 is a vertical section of the spacer of FIG. 3 taken along lines IV—IV in FIG. 3.
Figure 6:
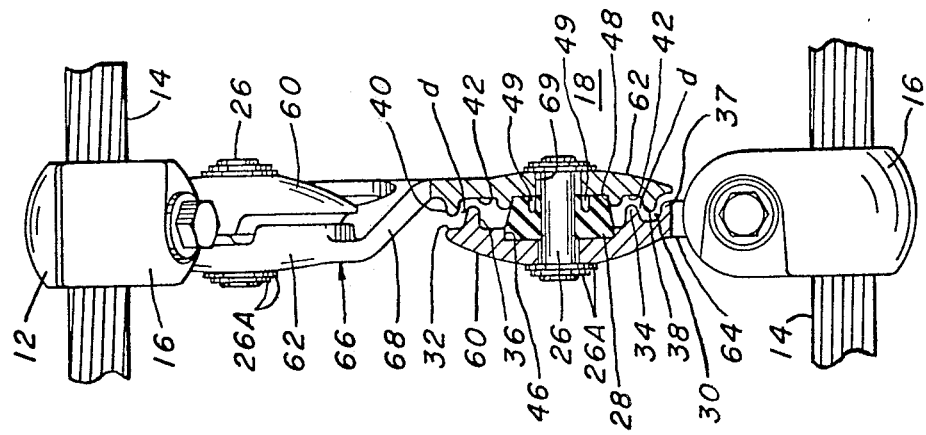
FIG. 6 is a vertical section of the spacer of FIG. 5 taken along lines VI—VI in FIG. 5.

As seen in the sectional views of FIGS. 2, 4 and 6 of the drawings, the recesses 46 and 48, and both ends of bushings 28 are tapered. The angles of the tapers of the recesses, however, need not be the same as the angles of the tapers of the bushings, and preferably the angles of the recesses are smaller than those of the bushings. In this manner, when the spacer is assembled, the bushings are wedged into the recesses under a predetermined columnar load, the material of the bushings flowing in the recesses to provide a snug mechanical fit between the hubs and bushings. This columnar or compression load is sustained by pin 26 (and appropriate outside washers 26A) to provide a secure wedge interlock between the hubs and bushings for proper, long-lasting operation of the damping spacer on overhead conductors. Such an assembly also eliminates the use of adhesives to secure the bushings in place.

Figure 3:
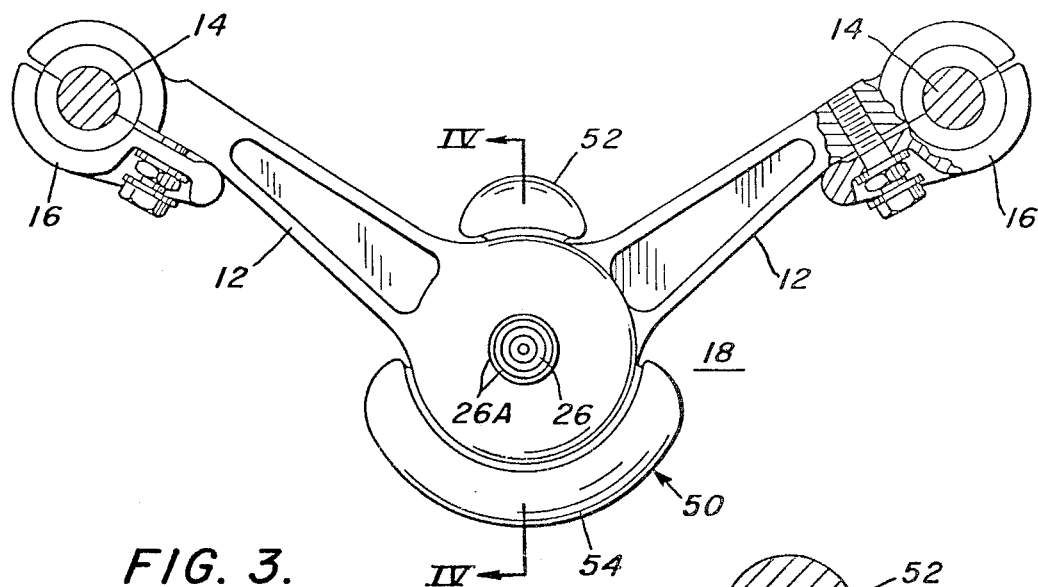
FIG. 3 is a side elevation view of a two-conductor, frameless damping spacer of the invention.

FIGS. 3 and 4 of the drawings show a two-conductor damping spacer of the invention, using the same two outside arms 12 of the spacer of FIGS. 1 and 2, with the inside arm (and its hub 24) of FIGS. 1 and 2 removed and replaced with a disc-like member 50 having the same tongue and groove construction as inside hub 24. The disc shown in FIGS. 3 and 4 is a heavy structure, having upper and lower masses 52 and 54 that provide an inertial weight which works against spacer arms 12 in the process of damping the motion of conductors 14 clamped to the arms. However, where two conductors will work against each other, in the damping process, disc 50 need not be a heavy structure.

As seen in FIG. 4 of the drawings, and as indicated above, the tongue and groove configurations of disc 50 are the same as that of the inside hub 24 of FIGS. 1 and 2, and hence bear the same numerical designations. In plan view, the configurations are the same as those of the inside hub of FIG. 7. For this reason, the disc and inside arm (and hub) are interchangeable, the disc providing the same travel spaces d and s, and opening 43, as inside hub 24, and utilizing the same damping elements 28, such that relative, resilient motion of the disc and the two upper spacer arms is provided when the conductors associated with the arms vibrate or oscillate. Hence, in a manufacturing run of the damping spacer of the invention, the spacer can be changed between a two and a three-conductor spacer by simply interchanging the inside arm of FIGS. 1 and 2 and the disc 50 of FIGS. 3 and 4.

Figure 5:
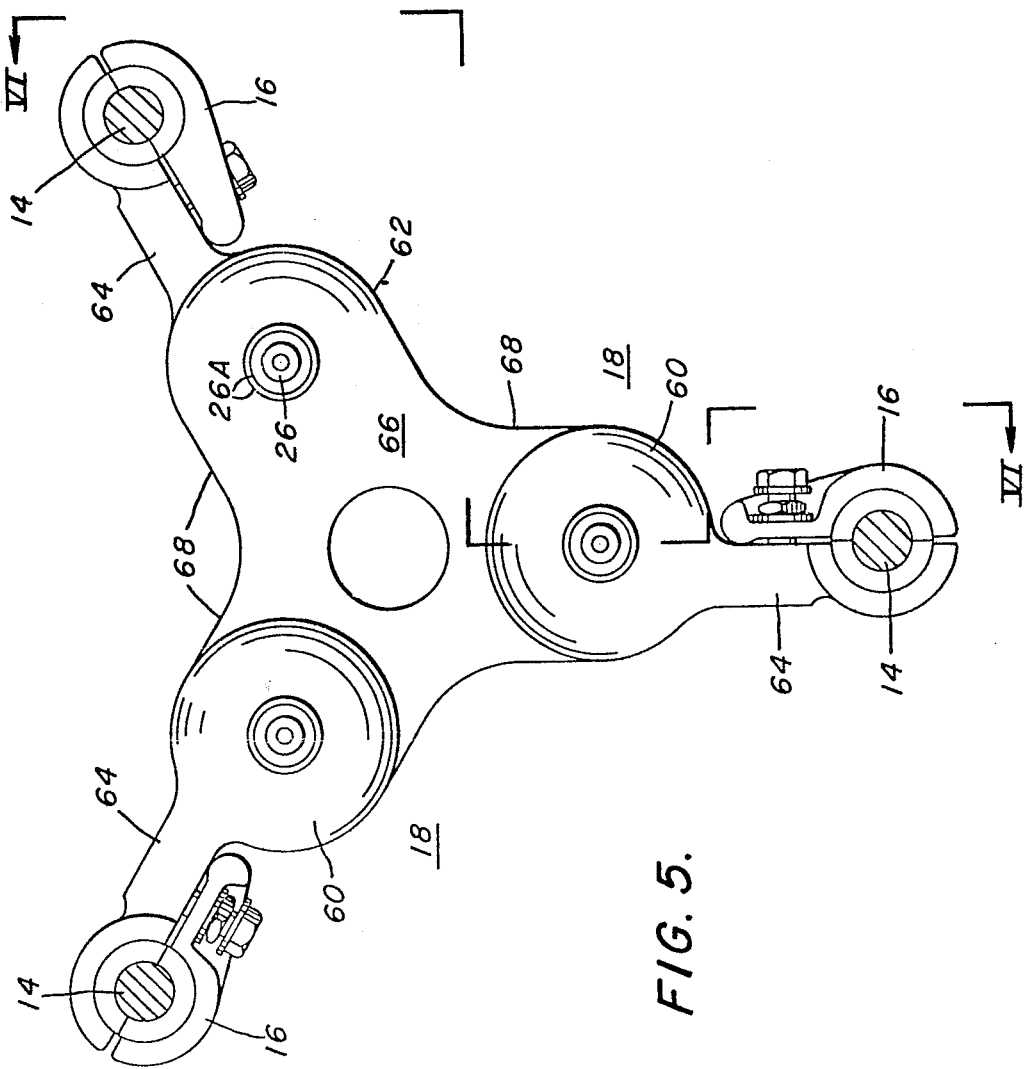
FIG. 5 is a side elevation of a frame-type spacer of the invention.

The hub structure of the invention is not limited to a frameless-type of spacer, as described thus far, but is also useful in a frame-type damping spacer, such as shown in FIGS. 5 and 6. Again, the hub structure is generally labeled 18, but consists of only two mating hub structures 60 and 62, as seen in FIG. 6, hub structure 60 being integral with clamping arm 64, while hub 62 is integral with frame 66. Hence, for a three-conductor bundle spacer, such as shown in FIGS. 5 and 6, frame 66 has three hub structures 62 located at the extremities of three extensions or legs or arms 68 of the frame. In addition, in the frame-type spacer of FIGS. 5 and 6, only a single damping bushing 28 is needed at each hub assembly 18, as seen in FIG. 6.

As visible further from the view of FIG. 6, hub structures 60 and 62 have the same recesses 30, 32, and 42, and the tongues 34, 36, 37, 38 and 40, with travel spaces d and s (only d being visible in FIG. 6), as the hub structures of the frameless spacer to permit working of bushing 28 in the manner discussed above in connection with FIGS. 1 to 4 and 7 to 9, to effect damping of conductor motion.

In order for travel space d to be effective in the embodiment of FIGS. 5 and 6, one of the hub structures, as in the previous embodiments, must have an opening 69, for pin 26, that is larger than the diameter of the pin by an amount at least as large as the travel distance d. In FIG. 6, opening 69 is shown in hub structure 62.

The frame-type construction of the invention is particularly advantageous when considering the increasing number of conductors in a bundle that accompanies the increasing amounts of power being transmitted on modern, extremely high voltage transmission lines. With such lines, the distances between the conductors of the bundle also become increasingly large. With a frameless spacer, a hub structure is needed for each conductor, and a damping element between each two hub structures, thereby making the hub assembly extremely bulky, the bulkiness, of course, depending upon the actual number of conductors to be spaced. And, because of the above large distances between the conductors, the spacer arms, of course, are long. With a frame-type spacer, however, each hub assembly thereof comprises only two hub structures, with only one damping element, and only a single, large frame member connecting the hub assemblies together. The clamping arms, in turn, are relatively short.

Figure 11:
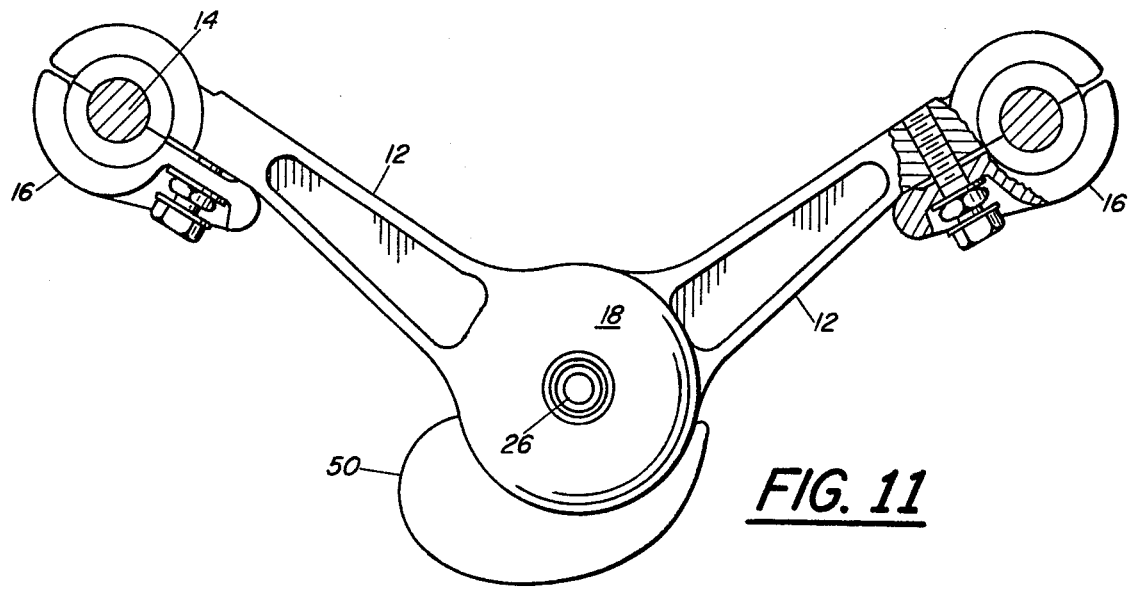
FIG. 11 is a side elevation view of another embodiment of a two-conductor damping spacer of the invention.
Figure 12:
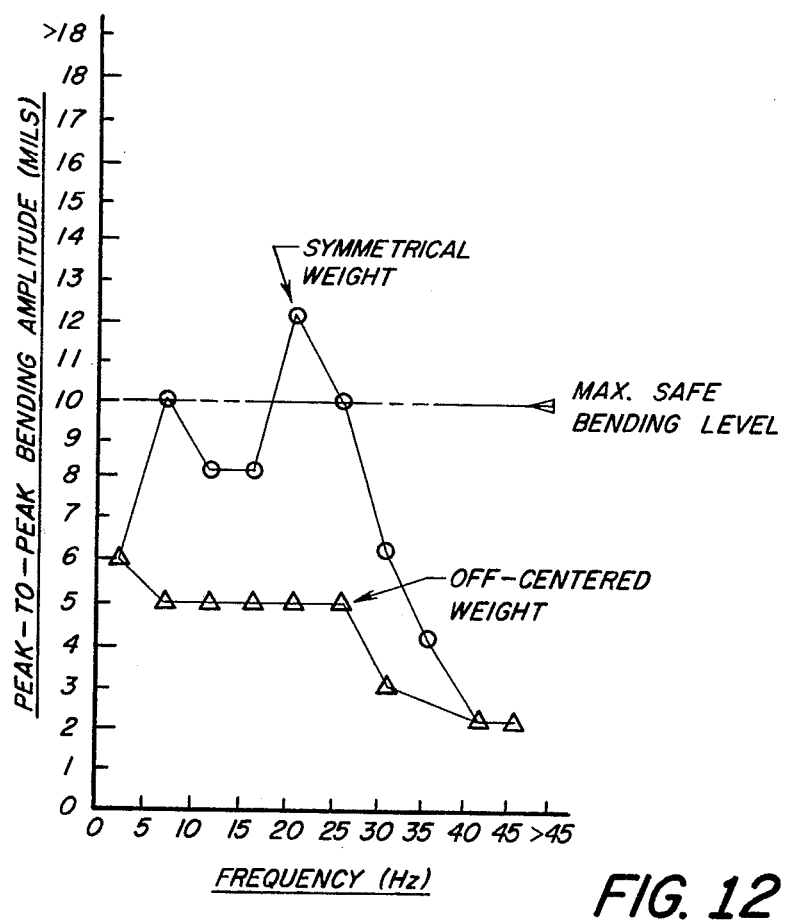
FIG. 12 is a graph comparing the vibration damping ability of the spacer of FIG. 11 to that of the spacer of FIGS. 3 and 4 for relatively large conductor sizes in a two-conductor bundle arrangement.

FIG. 11 of the drawings shows in elevation a damping spacer for a type of a two-conductor bundle that is particularly difficult to dampen. In damping two-conductor bundle arrangements in which the diameter sizes of the conductors are about one inch to 1.3 inches, the relatively heavy disc-like member 50 (of FIGS. 3 and 4) can be symmetrically located in the space between the conductors. A weight of four pounds for member 50 has proven effective to work elastomer members 28 and thereby dampen conductor vibration. However, with a larger diameter conductor, i.e. a conductor having diameters larger than 1.3 inches, and up to 1.875 inches, the two conductors of the bundle tend to vibrate during low frequencies in phase such that the weight 50 moves in phase with the conductors and hence does not work the elastomer members to dissipate the energy received from the wind causing the vibration. Experimentation has shown that by locating the weight 50 to one side in the space of the bundle, as depicted in FIG. 11, and using a somewhat heavier weight (for such larger conductors), the angular rotation of the weight about its pivot 26 is doubled at lower frequencies of vibration, i.e. 3 to 30 Hertz. The doubling of weight rotation, of course, doubles the damping capability of the spacer, as shown in the graph of FIG. 12, the damping data of FIG. 12 being obtained on a 1,000 foot span, 1.762 diameter stranded ACSR conductor strung at 25% of its rated strength at 60° F. The weight of member 50 was eight pounds and had, in cross section, the configuration shown in FIG. 4 of the drawings, except that the upper mass 52 (in FIG. 4) was removed. The abscissa of the graph shows the range of frequencies within which such conductors ordinarily vibrate. The ordinate of the graph shows bending amplitudes of the conductors (in mils) when the conductors undergo vibration. As clearly seen in FIG. 12 the low frequency damping capability of the off-center weight was double that of the symmetrical weight for the lower frequencies of vibration.

In all of the embodiments of the invention radiation of the sun is completely obscured from the center of the hub structures by the interfitting recesses 30, 32 and 42 and tongues 34, 36, 37, 38 and 40 of the hub structures. These recesses and tongues completely surround damping elements 28, as best seen in the sectional views of FIGS. 2, 4 and 6 and in the plan view of FIG. 9, and provide multiple corners, around which the sun's radiation cannot travel. In this manner, damping elements 28 are protected from the sun's radiation.

In contrast thereto, the damping elements in the above Hawkins and Bradshaw patents are only partially protected from the sun, as the hub structures shown therein do not have multiple wall structures that completely surround and obscure the elements. In the Hawkins patent, an edge portion of each damping element may be visible to the sun, depending upon the orientation of the spacer. Similarly, the downwardly extending clamping arms of the Bradshaw patent have openings that expose the torsion discs to the sun's rays.

In addition, the hub assembly of the invention provides lightning and other types of fault current protection for the damping elements, in that the spaces between the hub structures are not large enough to electrically separate and isolate the hubs from each other with the occurrence of a lightning or fault current stroke. When such occurs, the current will jump the relatively narrow spaces between the metal of the tongues and that of the surfaces of the corresponding recesses in the hub structures.

While the invention has been described in terms of preferred embodiments, the claims appended hereto are intended to encompass all embodiments which fall within the spirit of the invention.

Having thus described the invention and certain embodiments thereof, what is claimed is:

1. A frameless damping spacer for two parallel overhead conductors comprising:

two rigid elongated spacer arms,
an integral hub structure associated with each of the spacer arms,
a disc-like structure located between the hub structures, the disc-like structure being made of a relatively heavy material to provide an inertial weight for the damping spacer, the mass of inertial weight being off-center in the direction of one of the two spacer arms,
rigid pin means extending perpendicularly through the disc-like and hub structures to mechanically connect the structures together,
clamping means for securing the spacer arms to respective overhead conductors at locations remote from the hub structures,
opposed, radially offset, semi-circular wall portions provided on the faces of the hub structures facing the disc-like structure, and on both faces of the disc-like structure, the wall portions forming opposed, radially offset, semi-circular recesses in the disc-like and hub structures,
the hub and disc-like structures being disposed together such that the wall portions of the hub structures extend into the recesses of the disc-like structure, and vice versa,
the wall portions of the disc-like and hub structures being located at the same radial distance from the centers of the disc-like and hub structures,
the dimensions of the wall portions and the recesses being such that relative movement of the spacer arms and the disc-like structure is permitted,
a second recess provided in both faces of the disc-like structure and in the faces of the hub structures having the wall and recess portions, for receiving elastomer bushings, and
elastomer bushings located respectively between the faces of the disc-like and hub structures and in the second recesses.

* * * * *